Dec. 18, 1951

A. L. KETCHUM 2,578,809

PHONOGRAPH PICKUP

Filed Jan. 7, 1948

Inventor:
Arthur L. Ketchum
By J. D. Douglas Atty

Patented Dec. 18, 1951 2,578,809

UNITED STATES PATENT OFFICE 2,578,809

PHONOGRAPH PICKUP

Arthur L. Ketchum, Park Ridge, Ill., assignor to Admiral Corporation, Chicago, Ill., a corporation of Delaware Application January 7, 1948, Serial No. 880

12 Claims. (Cl. 179—100.41)

This invention relates to phonograph pickups, and particularly to improvement in bearing means by which a stylus-carrying member is adapted to be supported from a stationary member with respect to which the stylus carrying member is adapted to be moved, so that vibratory motion, created on engagement of the stylus with a driven record, will be transferred more effectively by a translator element into audio frequency currents.

Although the practice of supporting the vibratory members of a phonograph pickup by employing a solid bushing, or bushings, of some resilient plastic material, such as rubber compound, and more specifically to supporting the spindle member thereby from a substantially stationary member is known to the pickup art, the means of support is often unsatisfactory. One reason for this is that rubber compounds have the quality of being adapted to vibrate more freely at certain frequencies, depending, of course, on the nature of their compositions, than they are wont to vibrate at other frequencies. As a result, when the frequency of vibration, created by a phonograph record in engagement with the movable elements of a pickup, reaches a pitch at which the rubber is adapted to vibrate most freely, a state of resonance is created which gives rise to sound, the volume of which is out of proportion to sounds produced by vibrations at other frequencies resulting in amplitude distortion of certain frequencies. Another drawback to the use of solid rubber bushings is that they are comparatively stiff and have a slight stifling influence on the transfer of sound vibrations of some frequencies, and in particular such vibrations which are of low amplitude, resulting in undesirable dampening.

Due to the present invention, I am able to employ a resilient plastic material such as rubber, or rubber compound, for an element to support the spindle of my pickup from the base thereof, without the possibility of a resonant condition being created when need arises for the pickup to handle vibrations of a frequency at which the rubber employed is adapted to vibrate most freely. Additionally, I gain the advantage of greater freedom for rocking motion of the spindle. By thus adding to the freedom of the spindle, I am able to provide for reproduction of sound created by vibrations at amplitudes lower than hitherto possible of reproduction when rubber bushings were used as described.

To achieve the foregoing results, I support the minutely movable stylus-carrying member, or spindle, of my improved pickup from a substantially stationary member, or base, through the agency of a resilient element or section of resilient plastic material such as a compound of natural or artificial rubber to be referred to hereinafter as "rubber." By experiment, I have ascertained that I am able to overcome the problem of resonance of the rubber, as well as add to the freedom of movement of the spindle in respect to the base, by mechanically weakening the rubber against moments of force tending to deflect it laterally of its supports. The rubber of the resilient element may be suitably weakened by dividing it by slits, slots or apertures between the spindle and base. Preferably, this may be effected by a multiplicity of grooves or slots extending normal to one of the members in engagement with the resilient element, thereby providing a plurality of tongues or teeth adapted to offer less resistance to the torque of the spindle than the resistance offered by a solid resilient element. I also prefer to extend the slits or slots from the lower end of the bushing; that is, the end adjacent the stylus, nearly to the opposite end of the resilient element thus providing a shroud portion at one end to reinforce the teeth. This construction both enables the spindle to have freedom for rocking motion about its axis, and provides for some lateral swinging motion of the bottom of the spindle about the region thereof adjacent the shroud portion of the resilient element. Furthermore, I may squeeze the elastic bushing between the spindle and base, both to provide adhesion between bushing and base and between bushing and spindle. A suitable squeeze may be imparted to the bushing by providing, in the base, an aperture or pocket slightly smaller in diameter than the diameter of the bushing into which said bushing may be forcibly inserted. If desired, either the bushing or aperture or both bushing and aperture may be provided with a taper to facilitate insertion of the bushing into the pocket and squeezing of the bushing.

Other advantages of the invention will be apparent from the following specifications when considered in conjunction with the accompanying drawings in which.

Figure 1:
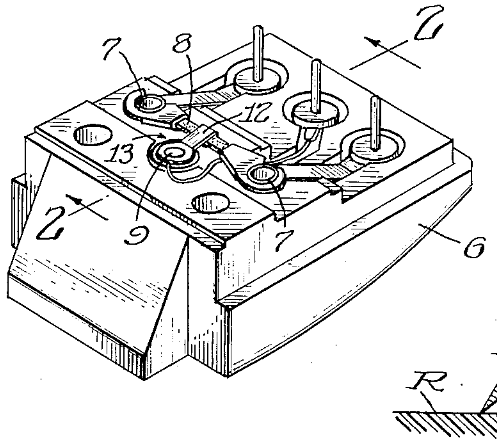
Fig. 1 is a perspective view of a pickup unit in which the invention is incorporated.
Figure 2:
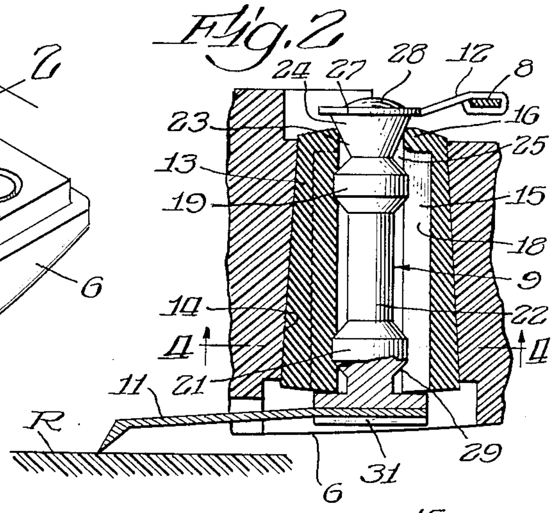
Fig. 2 is a section taken on the line 2—2 of Fig. 1.

In Fig. 1 for the purpose of illustration is shown a preferred embodiment of the invention in connection with the class of phonograph pickups which forms the subject matter of an application filed September 19, 1946, in the name of Neil E. Washburn, Ser. No. 698,063, now Patent No. 2,568,673, granted September 18, 1951, and consequently not described in detail herein. Briefly, the pickup comprises a stationary member or base 6 adapted to carry a pair of spaced apart terminals 7 to which a translatory element 8 is adapted to be anchored. The element 8 is grasped by one end of a metal arm 12, while the other end thereof is riveted to a post or spindle 9, later to be referred to in detail. To the lower end of the spindle 9 a needle, or stylus 11, is rigidly secured so that vibratory motion, created by the sound groove of a record R, is adapted to be transferred to the translator element S in order that a current of electricity in passing therethrough is adapted to be modulated for operation of a sound producing instrument.

Figure 3:
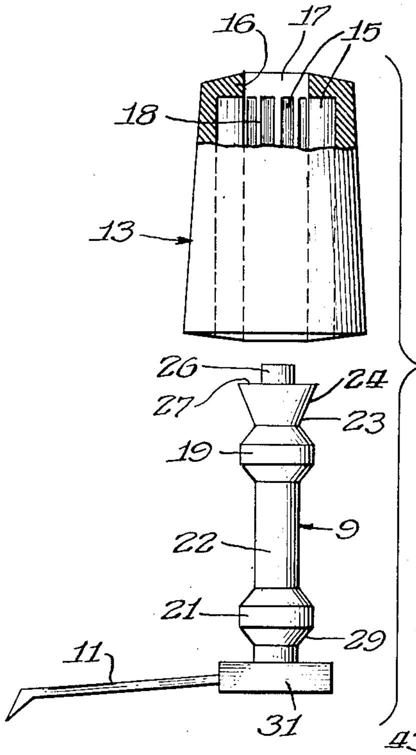
Fig. 3 is a view of parts indicated in Fig. 2, the spindle being in disassociated relationship to the bushing, a portion of which is broken away to show the internal teeth and reinforcement therefor.
Figure 4:
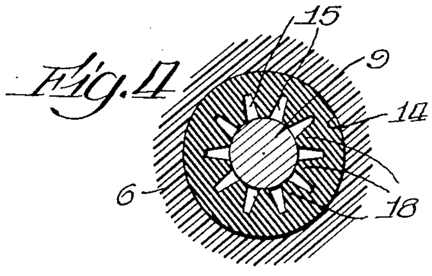
Fig. 4 is section taken on line 4—4 of Fig. 2.

The spindle 9 is adapted to be coupled to the base 6 by a bushing 13. The bushing is composed of some resilient plastic material such as a rubber compound, preferably a rubber compound which is comparatively low in its elastic quality. The normal formation of the bushing, i. e., its conformation before it is associated in assembly with other elements of the pickup, is substantially tubular. Desirably, although not essentially, it is also provided with an external surface which is slightly tapered and adapted to to be engaged by the walls of a bore 14, or pocket, in the base 6, tapered in complementary relationship to the bushing. The upper or small end of the bushing includes, internally thereof, a shroud 16 from which extend, throughout the remaining length of the bushing, a plurality of grooves 15. Although the shroud 16 defines the internal wall surface of an aperture 17 which is of unbroken circular formation, the grooves 15 break the continuity of the remaining internal length of the bushing and in part define the contour of a plurality of teeth 18. The tips of the teeth 18 continue, preferably in parallel relationship to each other, from the aperture 17 as will be noted in Fig. 3.

The spindle 9 may include tooth engaging portions 19 and 21 of similar diameter which is slightly greater than the diameter of the cylindrical space normally defined by the tips of the teeth 18. The spindle 9 also includes a mid section 22, of reduced diameter, which is substantially smaller than the diameter of the space normally defined by the tips of the teeth 18. Additionally, from an annular groove 23, beside the portion 19, the spindle is flared uniformly outward at 24 while at the base of a shank 26, of reduced diameter, extending from the flared portion, is provided a shoulder 27. The shank 26 extends through the arm 12 and a riveted head 28, formed by upsetting the shank, clamps the arm against the shoulder 27. At the opposite end thereof, another annular groove 29 separates the portion 21 from a head 31 to which the stylus 11 is conveniently attached.

The process of assembling the foregoing parts of the pickup may be carried out either by inserting the spindle 9 into the space defined by the tips of the teeth 18 and then forcibly inserting both spindle 9 and bushing 13 into the aperture 14, or assembly may be effected by first forcing the bushing into the aperture and afterward forcibly inserting the spindle into the bushing. When associated in assembly with the bushing 13, said bushing is engaged by the head 31 of the spindle and the shroud 16 is in intimate association with the outwardly flared portion 24. An air space 25 is thereby left between the tooth engageable portion 19 and the shroud 16. Thereafter, the arm 12 is riveted to the spindle 9, but the diameter of the bushing is normally slightly larger, after the order of .005 of an inch, than corresponding diameters of the bore. Since the tooth engageable portions 19 and 21 are also slightly larger in diameter, after the order of .008 of an inch, than the space normally defined by the tips of the teeth 18, the bushing is deformed slightly and advantage is taken of the consequent and continuous squeeze on the bushing to provide gripping engagement thereof on spindle and base to operatively associate the spindle with the base. The mid section 9, on the other hand, is not engaged, or but comparatively lightly engaged, by the tips of the teeth 18 so that most of the retention exerted by the bushing on the spindle is by cooperation between the teeth and portions 19 and 21. Of the total retentive force that the teeth exert on the spindle, the major part is exerted on the portion 19. This is in part due to the decreased thickness of the walls of the bushing, adjacent the portion 19, and partly to the shroud 16 which reinforces the teeth and provides more rigid support for the spindle than the support provided by the teeth 18.

Figure 5:
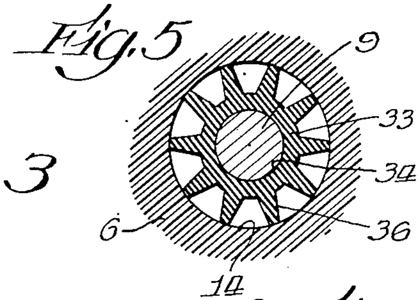
Fig. 5 is a section corresponding to Fig. 4 but indicating a second embodiment of the invention.

The second embodiment of the invention, indicated in Fig. 5, involves use of a resilient toothed bushing 33 which has a uniform bore 34, against which the spindle 9 exerts sufficient pressure to provide operable engagement. A series of teeth 36 extending radially thereof also extends throughout the length of the bushing and are adapted to be in pressure contact with the bore 14.

Figures 6, 7:
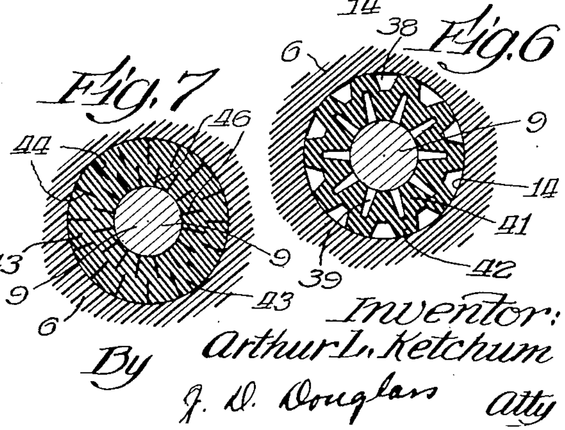
Fig. 6 is a section corresponding to Fig. 4 in which a third embodiment of the invention is indicated.
Fig. 7 is a section also corresponding to Fig. 4 but indicating a fourth embodiment of the invention.

A third embodiment of the invention is depicted in Fig. 6. In this construction the spindle 9 is spaced and supported from the base 6 by a bushing, the external and internal surface of which is broken by longitudinal slots 38 and 39 in part, defining internal teeth 41 and external teeth 42. Like the two previously described embodiments, the bushing is pinched between the bore 14 and the spindle 9.

A fourth embodiment of the invention is indicated in Fig. 7 wherein the spindle 9 is spaced and supported from the base 6 by a bushing 43. The regions of the bushing adjacent the external curved surface thereof are broken by a plurality of slits 44, while a series of slits 46 break the continuity of regions of the internal surface of the bushing. Both the slits 44 and the slits 46 are adapted to reduce the rigidity of the bushing so as to enable the spindle 9 to be rocked more freely and also overcome the disadvantage of resonance.

Although I have shown the bushing as being slightly tapered, rather than cylindrical, it will be appreciated that most of the advantages of the invention may be realized from a bushing that is cylindrical throughout its length, and, furthermore, the taper may be increased should it be found desirable.

Having thus described my invention in four embodiments thereof, I am aware that numerous and extensive departures may be made therefrom without departing from the spirit or scope of the appended claims.

I claim:

1. In a pickup apparatus for a phonograph record player comprising a base member and translatory apparatus in association therewith including a spindle member; means by which said members are adapted to be coupled to each other comprising, a resilient element between said members, said element including a spindle engageable portion and a base engageable portion, and means providing longitudinal interruptions in the continuity of one of said portions to add flexibility to said portion, said flexibility increasing freedom for motion of said spindle member in respect to said base member.

2. In a pickup apparatus for a phonograph record player comprising a base member and translatory apparatus in association therewith including a spindle member; means by which said members are adapted to be coupled to each other comprising, means providing a holding surface on said base member, a resilient element, means providing a holding surface on said resilient element by which said spindle member is adapted to be coupled thereto, said spindle when thereby associated with said resilient element being adapted to be coupled to said base member by said holding surface thereon, and means providing longitudinal interruptions in the continuity of the holding surface on said resilient element to add yieldability thereto and thereby add to the movability of said spindle member with respect to said base member.

3. In a pickup apparatus for a phonograph record player comprising a base member and translatory apparatus in association therewith including a spindle member; means by which said members are adapted to be coupled to each other comprising, an aperture in said base member, said spindle member being adapted to extend through said aperture, a resilient element between the walls of said aperture and said spindle member, and slot means by which the strength of the surface regions of said resilient element are adapted to be decreased, to thereby add to the rotatability of said spindle member with respect to said base member.

4. In a pickup unit for a phonograph record player comprising a carrier member and translatory means in association therewith including a spindle member; means by which said members are adapted to be coupled to each other comprising, a pocket in said carrier member, a tubular resilient element between said spindle member and the walls of said pocket by which said resilient element is adapted to be squeezed between said spindle member and said carrier member thereby providing adhesion between said element and the walls of said pocket and between said element and said spindle member, and slot means by which the regions of said resilient element at one of the surfaces thereof providing coupled relationship between said spindle and carrier members is adapted to be weakened to thereby provide for added freedom of motion of said spindle member in respect to said carrier member.

5. In a pickup unit for a phonograph record player comprising a carrier member and translatory means in association therewith including a spindle member; means by which said members are adapted to be coupled to each other comprising, an aperture in said carrier member, a resilient element between said spindle member and the walls of said aperture, means by which said resilient element is adapted to be squeezed between said spindle member and said carrier member thereby providing adhesion between said element and the walls of said aperture and between said element and said spindle member, means by which the continuity of the regions of said resilient element at the internal surface thereof are adapted to be broken to thereby provide for added freedom of motion of said spindle member in respect to said carrier member.

6. A pickup unit for a phonograph record player comprising a carrier member and translatory means in association therewith including a spindle member and means by which said members are adapted to be coupled to each other comprising, means providing an aperture in said carrier member, a tubular resilient element between said spindle member and the walls of said aperture, means providing a plurality of slots both internally and externally of said resilient element to reduce the strength of the surface regions of said element, teeth provided by said slots, said teeth being adapted to engage the walls of said aperture and said spindle member, and means by which said element is adapted to be squeezed between said spindle and carrier members to thereby provide adhesion between said element and the walls of said aperture and adhesion between said element and said spindle member.

7. A pickup unit for a phonograph record player comprising a carrier member and translatory means in association therewith including a spindle member and means by which said members are adapted to be coupled to each other comprising, means providing an aperture in said carrier member, a tubular resilient element between said spindle member and the walls of said aperture, means by which said resilient element is adapted to be squeezed between said members to thereby provide adhesion between said element and the walls of said aperture and adhesion between said element and said spindle member, and means providing a plurality of slits in at least one of the surfaces of said resilient element to reduce the strength of the surface regions of said element, tooth portions provided by said slits, said tooth portions being adapted to engage at least one of said members, thereby providing for an increase in freedom for motion of said spindle member.

8. In a pickup unit for a phonograph record player comprising a carrier member and translatory means in association therewith including a spindle member; means by which said members are adapted to be coupled to each other comprising, an aperture in said carrier member, a resilient element between said spindle member and the walls of said aperture, means by which said resilient element is adapted to be squeezed between said spindle member and said carrier member thereby providing adhesion between said element and the walls of said aperture and between said element and said spindle member, slot means by which the regions of said resilient element at the external surface thereof are adapted to be weakened to thereby provide for added freedom of motion of said spindle member in respect to said carrier member.

9. Pickup apparatus of the class described comprising a base, an elastic translator element anchored to said base, a rigid arm extending from said translator element, a stylus, a spindle by which rigid coupling between said stylus and said arm is provided, and means by which said spindle is adapted to be supported from said base comprising, a hollow resilient element, said spindle being adapted to extend through said element, means by which the continuity of the regions of said element at the internal surfaces thereof is adapted to be broken, said surface being thus rendered more yieldable, teeth provided by said last named means, a tooth engageable portion on said spindle toward either end thereof, said tooth engageable portions being adapted to be engaged by said teeth, means providing an aperture in said base of diametral size slightly less than the diametral size of said hollow resilient element, said element being received between the walls of said aperture and said spindle member to squeeze said element and thereby provide adhesion between said element and said base and between said element and said spindle, and flange means at one end of said element extending between said teeth to reinforce said teeth thereby providing for less freedom of movement of said spindle at one end thereof than at the opposite end.

10. Pickup apparatus of the class described comprising a base, an elastic translator element anchored to said base, a rigid arm extending from said translator element, a stylus, a spindle by which rigid coupling between said stylus and said arm is adapted to be provided, and means by which said spindle is adapted to be supported from said base comprising, a hollow resilient element, said spindle being adapted to extend through said element, means providing a plurality of internal teeth extending from one end of said element, a shroud portion at the other end of said element, the tips of said teeth continuing from the internal surface of said shroud portion throughout the remaining length of said element, tooth engageable portions on said spindle adapted to be engaged by the tips of said teeth, means providing an aperture in said base, said aperture being adapted to receive said element therein, and means providing for squeezing of said element between said spindle and said base including means by which a tapered abutting relationship therebetween is attained to thereby provide adhesion of said element with said base member and adhesion between said teeth and said tooth engaging portions, said teeth providing for freedom of motion of said spindle when so engaged, the end of said element having the shroud portion thereon being adjacent said translator element, said shroud portion being adapted to reinforce the ends of said teeth to provide less freedom for motion of the end of said spindle adjacent said translator element than the other end of the spindle.

11. In a pickup apparatus for a phonograph record player comprising a base member and translatory apparatus in association therewith including a spindle member; bearing means by which said members are adapted to be coupled to each other comprising, an aperture in said base member, said spindle member being adapted to extend through said aperture, a resilient bearing between the walls of said aperture and said spindle member, and slot means by which the strength of the surface regions of said resilient element are adapted to be decreased, to thereby alter the dampening quality of said bearing.

12. A phonograph pickup including a body member, an opening formed through the body member, a longitudinally extending resilient sleeve lining said opening, teeth carried by said sleeve and extending radially inward therefrom, a spindle carried by said teeth, a stylus carried on one end of said spindle and means for converting mechanical vibrations into electrical currents connected to the other end of said spindle.

ARTHUR L. KETCHUM.

REFERENCES CITED

The following references are of record in the file of this patent:

UNITED STATES PATENTS

| Number | Name | Date |
|---|---|---|
| 1,909,995 | Yeider | May 23, 1933 |
| 2,042,606 | Kotowski | June 2, 1936 |
| 2,348,526 | Dally | May 9, 1944 |
| 2,356,027 | Boyd et al. | Aug. 15, 1944 |
| 2,366,860 | Kraft | Jan. 9, 1945 |
| 2,415,403 | Bachman | Feb. 11, 1947 |
| 2,451,221 | Hutter | Oct. 12, 1948 |
| 2,480,272 | Thompson | Aug. 30, 1949 |

FOREIGN PATENTS

| Number | Country | Date |
|---|---|---|
| 213,019 | Great Britain | Mar. 27, 1924 |
| 604,077 | Great Britain | June 28, 1948 |